(12) United States Patent
Go

(10) Patent No.: US 11,858,024 B2
(45) Date of Patent: Jan. 2, 2024

(54) METHOD AND DEVICE FOR MANUFACTURING SAFETY VENT OF CAP PLATE FOR SECONDARY BATTERY, METHOD FOR MANUFACTURING CAP PLATE USING METHOD FOR MANUFACTURING SAFETY VENT, AND CAP PLATE FOR SECONDARY BATTERY MANUFACTURED BY METHOD FOR MANUFACTURING CAP PLATE

(71) Applicant: BCGEN CO., LTD., Ansan (KR)

(72) Inventor: Si Jin Go, Seoul (KR)

(73) Assignee: BCGEN CO., LTD., Ansan (KR)

( * ) Notice: Subject to any disclaimer, the term of this patent is extended or adjusted under 35 U.S.C. 154(b) by 835 days.

(21) Appl. No.: 16/963,155

(22) PCT Filed: Jan. 15, 2019

(86) PCT No.: PCT/KR2019/000586
§ 371 (c)(1),
(2) Date: Jul. 17, 2020

(87) PCT Pub. No.: WO2019/143098
PCT Pub. Date: Jul. 25, 2019

(65) Prior Publication Data
US 2021/0121933 A1   Apr. 29, 2021

(30) Foreign Application Priority Data
Jan. 18, 2018  (KR) .................. 10-2018-0006536

(51) Int. Cl.
*B21D 28/26* (2006.01)
*H01M 50/342* (2021.01)
*H01M 50/15* (2021.01)

(52) U.S. Cl.
CPC ............ *B21D 28/26* (2013.01); *H01M 50/15* (2021.01); *H01M 50/3425* (2021.01); *H01M 2200/20* (2013.01)

(58) Field of Classification Search
CPC ........... H01M 2200/20; H01M 50/147; H01M 50/148; H01M 50/15; H01M 50/30;
(Continued)

(56) References Cited

FOREIGN PATENT DOCUMENTS

JP    H11250885 A  *  9/1999
JP    200123595 A  *  1/2001
(Continued)

OTHER PUBLICATIONS

Search Report for International Application No. PCT/KR2019/000586, dated May 9, 2019.

*Primary Examiner* — Katrina M Stransky
*Assistant Examiner* — P Derek Pressley

(57) ABSTRACT

The present invention provides a method and a device for manufacturing a safety vent of a cap plate for a secondary battery, a method for manufacturing a cap plate using the method for manufacturing a safety vent, and a cap plate for a secondary battery manufactured by the method for manufacturing a cap plate, which can prevent a molding defect in a safety vent of the strength of a vent plate becoming excessively great, by easily molding the safety vent with only one or two times of forging processing in order to prevent a phenomenon in which hardening by forging occurs, during forging, in the vent plate formed at the lower part of the safety vent.

7 Claims, 9 Drawing Sheets

(58) Field of Classification Search
CPC ............ H01M 50/342; H01M 50/3425; B21D 28/26; B21D 28/265; B21J 5/02; B21J 5/027; Y02E 60/10
USPC .......................... 72/353.2, 355.2, 355.4, 356
See application file for complete search history.

(56) References Cited

FOREIGN PATENT DOCUMENTS

| | | | |
|---|---|---|---|
| JP | 2004111155 A | * | 4/2004 |
| KR | 101370855 B1 | | 3/2014 |
| KR | 101416520 B1 | * | 7/2014 |
| KR | 101471958 B1 | * | 12/2014 |
| KR | 101471958 B1 | | 12/2014 |
| KR | 1020150004747 A | | 1/2015 |
| KR | 1020150113582 A | | 10/2015 |
| WO | WO2014126408 A1 | | 8/2014 |

* cited by examiner

METHOD AND DEVICE FOR MANUFACTURING SAFETY VENT OF CAP PLATE FOR SECONDARY BATTERY, METHOD FOR MANUFACTURING CAP PLATE USING METHOD FOR MANUFACTURING SAFETY VENT, AND CAP PLATE FOR SECONDARY BATTERY MANUFACTURED BY METHOD FOR MANUFACTURING CAP PLATE

CROSS-REFERENCE TO RELATED APPLICATIONS

The present application is a National Phase entry of International Application No. PCT/KR2019/000586, filed on Jan. 15, 2019, which claims the benefit of priority based on Korean Patent Application No. 10-2018-0006536, filed on Jan. 18, 2018, the entire contents of which are incorporated herein by reference.

TECHNICAL FIELD

The present invention relates to a method and device for manufacturing a safety vent of a cap plate for a secondary battery, a method for manufacturing the cap plate using the method for manufacturing the safety vent, and the cap plate for the secondary battery manufactured by the method for manufacturing the cap plate, so as to easily mold a safety vent by only once or two times of forging processes.

BACKGROUND ART

In general, various solutions have been proposed to ensure the safety of a secondary battery, in which the solutions include a safety vent that is used in the battery to release gas generated in the battery to the outside at a predetermined pressure or more.

In addition, the safety vent is usually formed in a cap plate of the secondary battery. In other words, the valve, which is ruptured due to an internal pressure when an abnormal pressure occurs in the battery and discharging gas in the battery, is provided in the cap plate of the secondary battery.

First, a battery cap plate manufacturing method that constitutes "BATTERY CAP PLATE HAVING SAFETY VENT FOR ELECTRIC VEHICLE AND MANUFACTURING METHOD THEREOF" (hereinafter, referred to as a "conventional battery cap plate manufacturing method") of Korean Registered Patent No. 1043577 previously filed by the applicant will be described as follows.

The conventional battery cap plate manufacturing method includes a first process of preparing a plate that is a metal material for a cap plate, a second process of seating the plate at a center so as to be spaced apart from fixing frames on both sides at regular intervals, a third process of primarily pressurizing the plate mechanically with a hammer at 180 tons to 300 tons from the top so that a groove is formed in a predetermined shape and the plate is stretched to both sides, a fourth process of secondarily pressurizing the plate mechanically with the hammer at 200 tons to 280 tons from the top to deeply form the groove, so that the plate is stretched to the both sides and comes into close contact with the fixing frames, and a fifth process of tertiarily pressurizing the plate mechanically with the hammer at 180 tons to 290 tons from the top, so that a cap plate formed with a safety vent integrally thin at the plate portion formed with the groove.

However, when the cap plate is manufactured through the battery cap plate manufacturing method in the above manner, the groove is formed through a forging process performed three times or more, and the safety vent is formed to have a thin thickness at a lower portion thereof, so that a forged hardening occurs at the thin portion of the safety vent due to the forging by three times or more, thereby causing a defect often in which the hardness of the safety vent is excessively high.

In addition, the conventional battery cap plate manufacturing method is required to perform the forging process at least three times to form the safety vent, thereby increasing a unit price for producing the cap plate due the increase of the number of forging times.

Document of the Related Art

"BATTERY CAP PLATE HAVING SAFETY VENT FOR ELECTRIC VEHICLE AND MANUFACTURING METHOD THEREOF" of Korean Registered Patent No. 1043577 (registered Jun. 16, 2011)

DISCLOSURE

Technical Problem

The present invention is provided to solve the above conventional problems.

An object of the present invention is to provide a method and device for manufacturing a safety vent of a cap plate for a secondary battery, a method for manufacturing the cap plate using the method for manufacturing the safety vent, and the cap plate for the secondary battery manufactured by the method for manufacturing the cap plate, so as to prevent a forming defect of the safety vent in which a vent plate has an excessive hardness, by preventing a forged hardening from occurring in the vent plate formed at a lower portion of the safety vent during forging by simply forming the safety vent using only once or two times of forging processes.

In addition, another object of the present invention is to enable a safety vent to be forged while minimizing a forging torque by moving and discharging a material downward while forming the safety vent by moving down an upper elevating mold.

In addition, another object of the present invention is to improve the productivity of manufacturing a cap plate by simply forming a safety vent with only once or two times of forging processes.

Technical Solution

The "method for manufacturing a safety vent of a cap plate for a secondary battery" according to the present invention to achieve the above-mentioned objects includes: a safety vent forming step in which a material plate of a cap plate is put on a top surface of a lower forming portion of a press, which includes a lower forming portion formed with a long elongated hole extending back and forth and provided therein with a lower elevating mold that defines a peripheral discharge part, and an upper forming portion provided therein with an upper elevating mold, a material is discharged to the peripheral discharge part to form a discharge material portion while forming a safety vent having a groove shape and formed at a lower portion thereof with a vent plate through downward movement of the upper forming portion and the upper elevating mold and upward movement of the lower elevating mold, and the safety vent is formed by moving up the upper forming portion and the upper elevating mold and moving down the lower elevating mold; a discharge material portion cutting and removing step in which the safety vent formed with the material plate is put on the top surface of the lower forming portion of the press having the lower forming portion formed with a discharge material portion insertion hole accommodating a cutting device for cutting an upper portion of the discharge material portion, so that the discharge material portion of the material plate is inserted into the discharge material portion insertion hole, and the upper portion of the discharge material portion is cut by operating the cutting device for the discharge material portion so as to remove the discharge material portion; and a lower surface flattening forming step in which the material plate from which the upper portion of the discharge material portion is cut is put on the top surface of the lower forming portion of the press including the lower forming portion having a flat surface and the upper forming portion formed on a lower portion thereof with a safety vent insertion part, and then the bottom surface of the material plate is flattened by moving down the upper forming portion and the upper forming portion is moved up.

In addition, in the safety vent forming step of the "method for manufacturing a safety vent of a cap plate for a secondary battery" according to the present invention, the upper forming portion and the upper elevating mold are moved down and the lower elevating mold is simultaneously moved up, or the lower elevating mold is moved up after the upper forming portion and the upper elevating mold are moved down, so that the safety vent is formed.

In addition, the cutting device of the "method for manufacturing a safety vent of a cap plate for a secondary battery" according to the present invention includes an internal cutting member positioned inside the discharge material portion, formed with slant blade portions at front, rear, left and right edges of an upper periphery of the cutting device, and configured to be movable in front, rear, left, and right directions through a driving device. In the discharge material portion cutting and removing step, the internal cutting member sequentially moves in a left direction and returns, moves in a right direction and returns, moves in a front direction and returns, and moves in a rear direction and returns so as to cut the upper portion of the discharge material portion.

Advantageous Effects

According to the present invention configured in the above manner, a forged hardening is prevented from occurring in the vent plate formed at the lower portion of the safety vent during forging by simply forming the safety vent using only once or two times of forging processes, so that a forming defect of a safety vent in which a vent plate has an excessive hardness can be prevented.

In addition, according to the present invention, forging of the safety vent is facilitated while a forging torque is minimized by moving and discharging the material downward while forming the safety vent by moving down the upper elevating mold, so that power energy can be reduced when the safety vent is forged.

In addition, according to the present invention, the safety vent is simply formed by only once or two times of forging processes, so that the productivity of manufacturing the cap plate can be improved.

BEST MODE

Mode for Invention

Hereinafter, exemplary embodiments of the present invention will be described in detail with reference to the accompanying drawings. However, it should be understood that the present invention may be implemented in various different forms and is not limited to the described embodiments.

Figure 1:
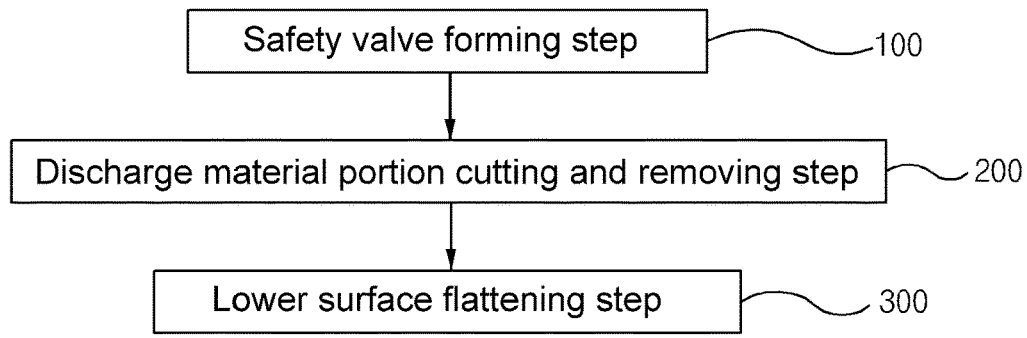
FIG. 1 is a process diagram showing a method for manufacturing a safety vent according to the present invention.
Figure 2A:
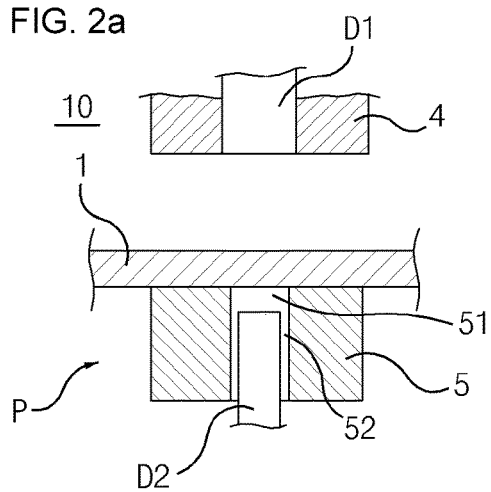
FIGS. 2a and 2b are front and side sectional views showing before forming of the safety vent.
Figure 2B:
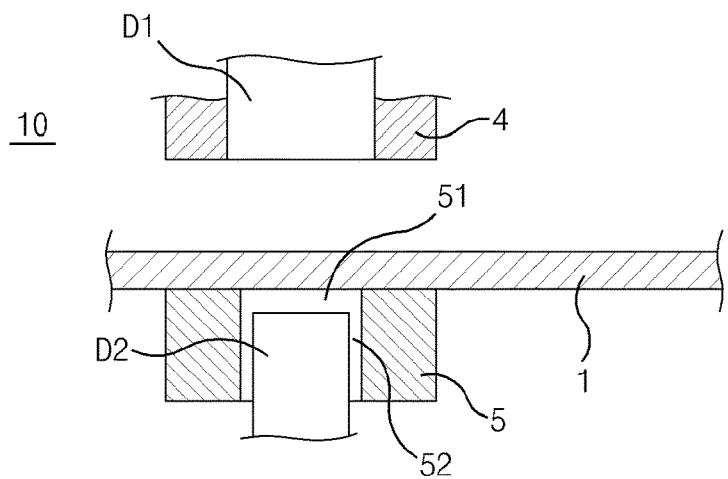
Figure 2C:
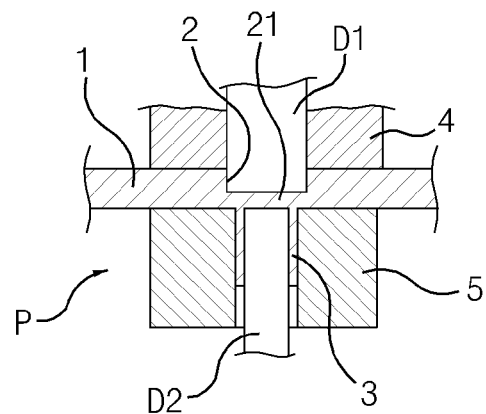
FIGS. 2c and 2d are front and side sectional views showing a state of forming the safety vent by operating upper and lower elevating molds.
Figure 2D:
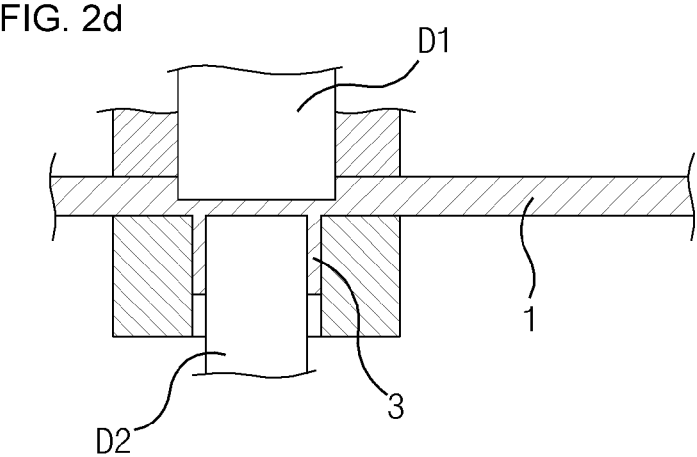
Figure 2E:
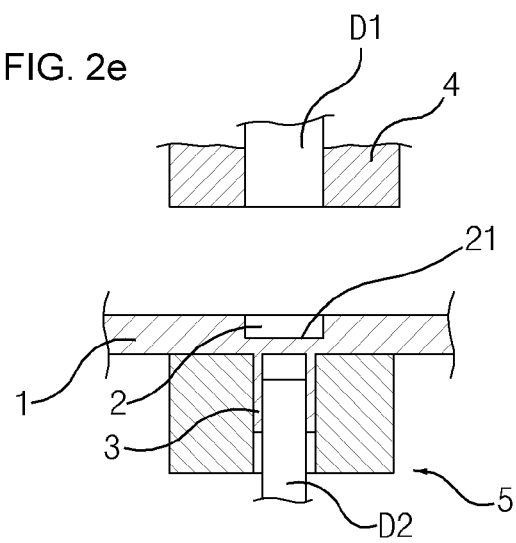
FIGS. 2e and 2f are front and side sectional views showing a state in which the upper and lower elevating molds return upward and downward.
Figure 2F:
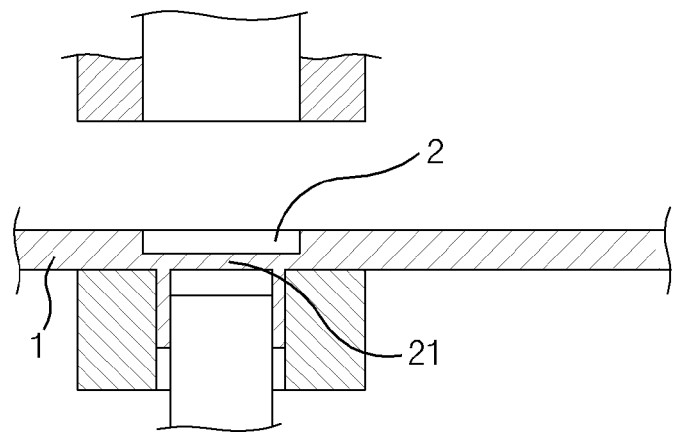
Figure 2G:
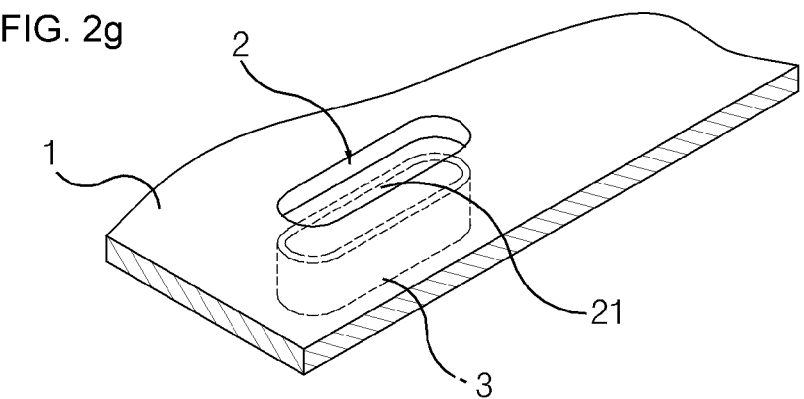
FIG. 2g is a schematic perspective view showing the safety vent formed together with a discharge material portion.
Figure 3A:
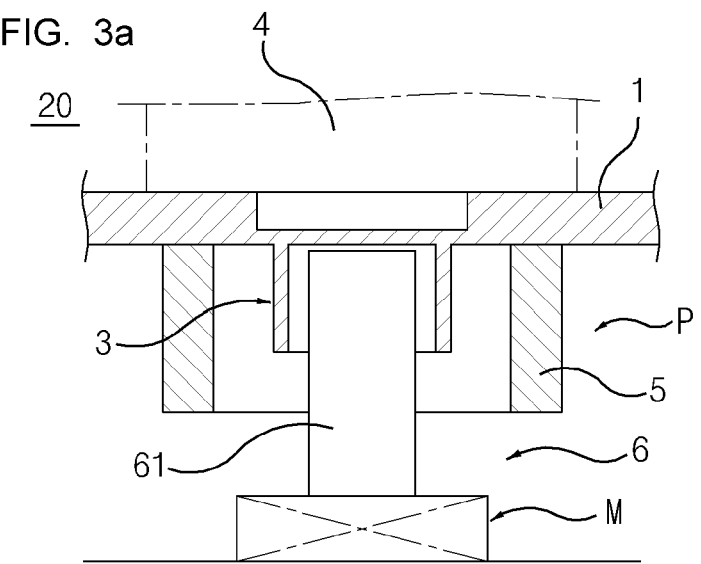
FIG. 3a is a side sectional view showing a state before cutting.
Figure 3B:
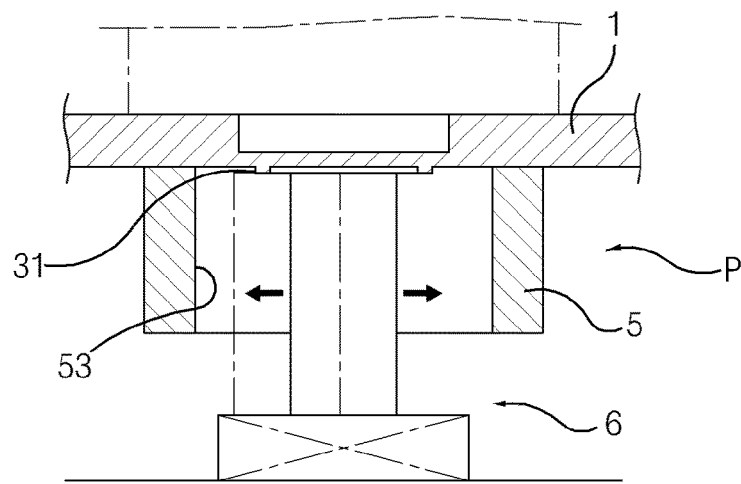
FIG. 3b is a side sectional view showing a cut state.
Figure 3C:
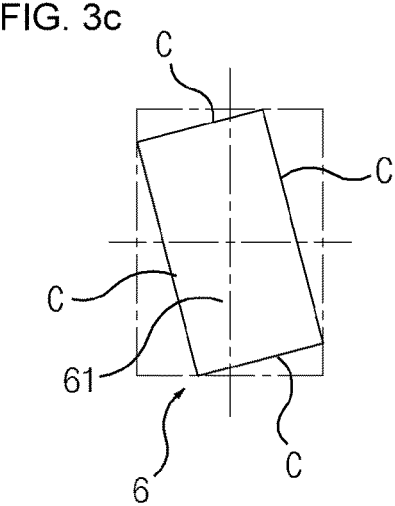
FIG. 3c is a schematic plan view showing the top of an internal cutting member.
Figure 4A:
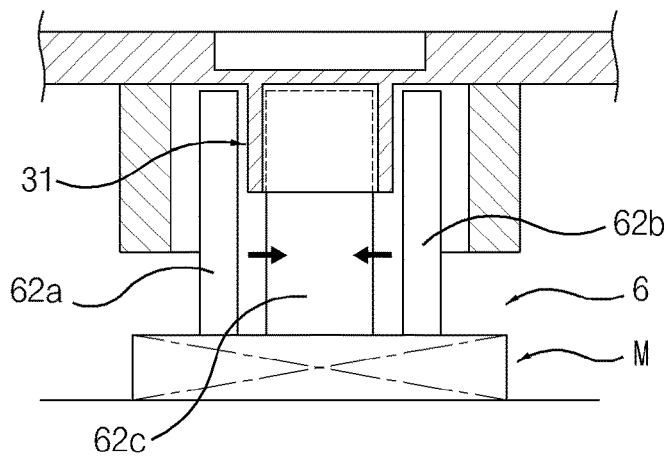
FIG. 4a is a side sectional view showing a state before the discharge material portion is cut.
Figure 4B:
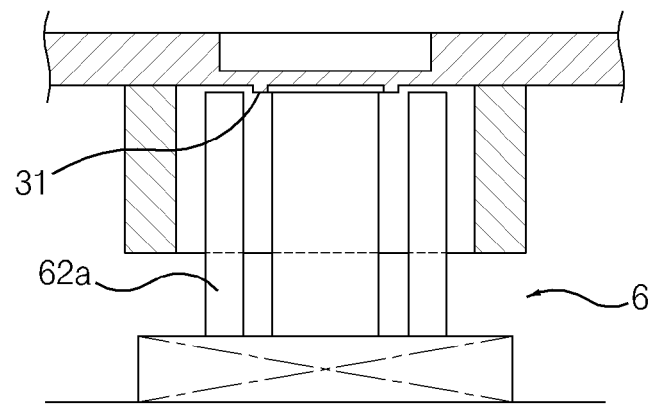
FIG. 4b is a side sectional view showing a state in which the discharge material is cut.
Figure 4C:
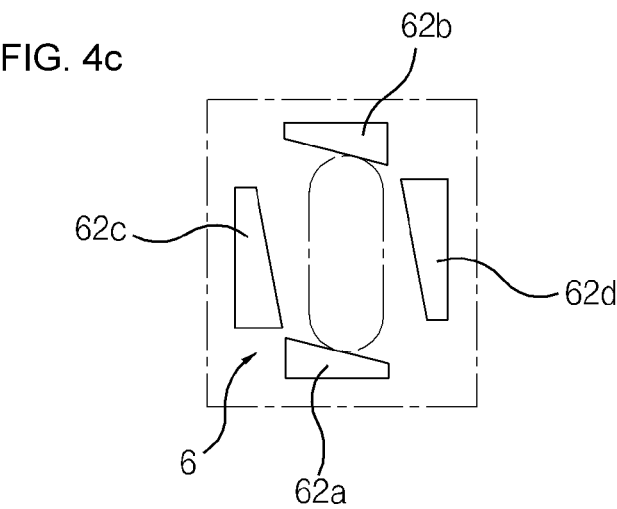
FIG. 4c is a schematic plan view showing front, rear, left and right cutting members when viewed from the top.
Figure 5A:
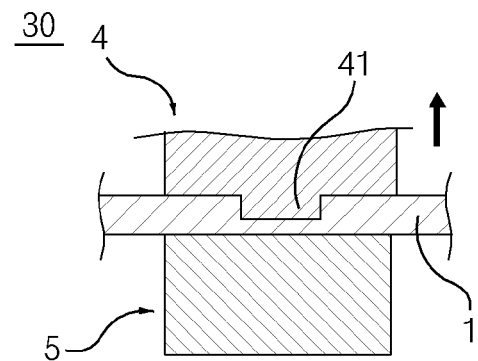
FIGS. 5a and 5b are front and side sectional views showing a state after flattening a lower surface.
Figure 5B:
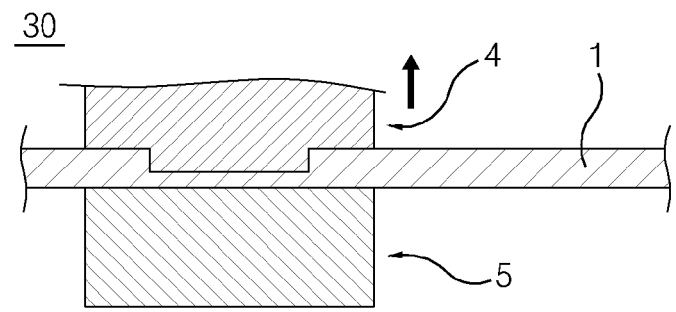
Figure 5C:
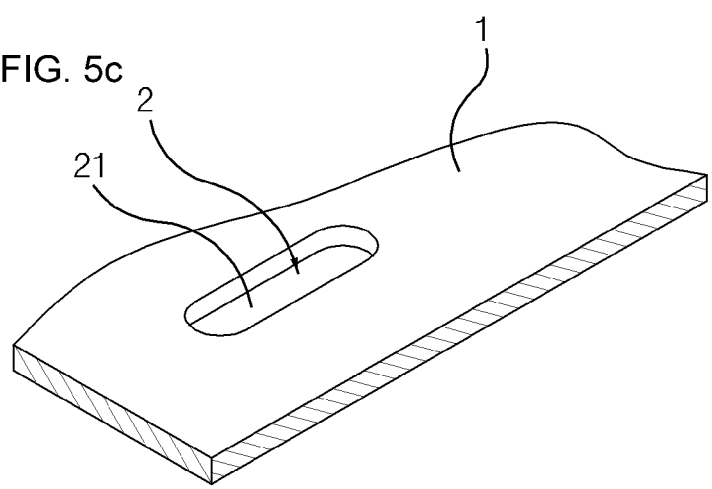
FIG. 5C is a schematic perspective view showing a safety vent that is finally formed.

FIG. 1 is a process diagram showing a method for manufacturing a safety vent according to the present invention. FIG. 2 shows views illustrating a safety vent forming step of the method for manufacturing the safety vent according to the present invention. FIG. 3 shows views illustrating a discharge material portion cutting and removing step the method for manufacturing the safety vent according to the present invention. FIG. 4 shows views illustrating a cutting device configured according to another embodiment of the present invention. In addition, FIG. 5 shows views illustrating a safety vent forming step of the method for manufacturing the safety vent according to the present invention.

As shown in the drawings, the method for manufacturing a safety vent of a cap plate for a secondary battery according to the present invention is configured to form a safety vent 2 in a material plate 1 of a cap plate, and includes a safety vent forming step 100, a discharge material portion cutting and removing step 200, and a lower surface flattening step 300.

First, in the safety vent forming step 100, as shown in FIGS. 1 and 2, a material plate 1 serving as a material of the cap plate is put on a top surface of a lower forming portion 5 of a press P including the lower forming portion 5 formed therein with a peripheral discharge part 52, accommodated therein with a lower elevating mold D2, and formed with a long elongated hole 51 rearward and forward, and an upper forming portion 4 provided therein with an upper elevating mold D1.

Then, after the material is discharged to the peripheral discharge part 52 to form a discharge material portion 3 while a safety vent 2 is formed in a groove shape to have a vent plate 21 at a lower portion of the material plate 1 by lowering the upper forming portion 4 and the upper elevating mold D1 and raising the lower elevating mold D2, the safety vent 2 is formed by returning and raising the upper forming portion 4 and the upper elevating mold D1 and returning and lowering the lower elevating mold D2.

In addition, in the safety vent forming step 100, the safety vent 2 may be formed by simultaneously lowering the upper forming portion 4 and the upper elevating mold D1 and raising the lower elevating mold D2 such that the safety vent is formed in one time of forging.

In addition, in the safety vent forming step 100, the safety vent 2 may be formed by raising the lower elevating mold D2 after lowering the upper forming portion 4 and the upper elevating mold D1 such that compressive loads applied to the upper forming portion 4 and the lower forming portion 5 are distributed and reduced.

Next, as shown in FIGS. 1 to 3, the discharge material portion cutting and removing step 200 proceeds after the safety vent forming step 100 is performed. First, the safety vent 2 formed with the material plate 1 is put on the top surface of the lower forming portion 5 of the press P having the lower forming portion 5 formed with a discharge material portion insertion hole 53 accommodating a cutting device 6 for cutting an upper portion of the discharge material portion 3, so that the discharge material portion 3 of the material plate 1 is inserted into the discharge material portion insertion hole 53. Then, the upper portion of the discharge material portion 3 is cut by operating the cutting device 6 for the discharge material portion so as to remove the discharge material portion 3.

In addition, in the discharge material portion cutting and removing step 200, a residual material part 31 at the upper portion of the discharge material portion 3 remains on a bottom surface of the material plate 1.

In addition, in the discharge material portion cutting and removing step 200, the upper forming portion 4 constituting the press P may be moved down to further press the top surface of the material plate 1, such that the material plate 1 put on the top surface of the lower forming portion 5 is more firmly fixed to the top surface of the lower forming portion 5.

The cutting device 6 may include an internal cutting member 61 positioned inside the discharge material portion 3, formed with slant blade portions C at front, rear, left and right edges of an upper periphery of the cutting device, and provided to be movable in front, rear, left, and right directions through a driving device M, so as to sequentially cut the discharge material portion 3. In addition, since various driving devices using a cylinder, a motor or the like are generally known for the driving device M configured to move the internal cutting member 61 in the front, rear, left, and right directions, the detailed description will be omitted.

Further, in the discharge material portion cutting and removing step 200, it is most preferable that the internal cutting member 61 sequentially moves in the left direction and returns, moves in the right direction and returns, moves in the front direction and returns, and moves in the rear direction and returns so as to cut the upper portion of the discharge material portion 3, so as to sequentially cut the discharge material portion 3.

In addition, as shown in FIG. 4, the cutting device 6 may include front, rear, left, and right cutting members 62a, 62b, 62c, and 62d positioned at front, rear, left and right outer sides of the discharge material portion 3, formed at each upper inner edge thereof with a slant blade portion C, and sequentially moved inward and outward one by one through the driving device M to cut the upper portion of the discharge material portion 3, such that the upper portion of the discharge material portion 3 is cut in an inward direction from the outside.

In addition, since various driving devices using a cylinder, a motor or the like are generally known for the driving device M configured to move each of the front, rear, left, and right cutting members 62a, 62b, 62c, and 62d inward and outward, the detailed description will be omitted.

Next, as shown in FIGS. 1 and 5, in the lower surface flattening forming step 300, the bottom surface of the material plate is formed into a flat surface by forging the residual material part 31 remaining on the bottom surface of the material plate 1 in the discharge material portion cutting and removing step 200.

In other words, the lower surface flattening forming step 300 proceeds after the discharge material portion cutting and removing step 200 is performed, in which, after the material plate 1 from which the upper portion of the discharge material portion 3 is cut is put on the top surface of the lower forming portion 5 of the press P including the lower forming portion 5 having a flat surface and the upper forming portion 4 formed on a lower portion thereof with a safety vent insertion part 41, the bottom surface of the material plate 1 is flattened by moving down the upper forming portion 4, and the upper forming portion 4 is moved up.

Thus, in the method for manufacturing the safety vent of the cap plate according to the present invention, the safety vent 2 may be simply formed even by only one time of forging process in which the upper forming portion 4 and the upper elevating mold D1 are moved down and the lower elevating mold D2 is simultaneously moved up, or two forging processes in which the upper forming portion 4 and the upper elevating mold D1 are moved down and then the lower elevating mold D2 is moved up.

Therefore, the method for manufacturing the safety vent of the cap plate of the present invention is the useful invention, in which a forged hardening is prevented from occurring in a vent plate 21 formed at a lower portion of the safety vent 2 during forging by simply forming the safety vent 2 through only once or two times of forging processes, so that a forming defect of a safety vent 2 in which a vent plate 21 has an excessive hardness can be prevented.

In other words, since the number of forgings to form the safety vent 2 according to the present invention is only one or two, the forged hardening of the bent plate, which conventionally occurs when the forging is performed three times or more, rarely occurs because the safety vent 2 of the present invention is forged once or two times.

In addition, the method for manufacturing a safety vent of a cap plate of the present invention is the useful invention, since forging of the safety vent 2 is facilitated while a forging torque is minimized by moving and discharging the material downward while forming the safety vent 2 by moving down the upper elevating mold D1 so that power energy can be reduced when the safety vent 2 is forged.

Meanwhile, as shown in FIG. 2, the device for manufacturing the safety vent of the cap plate for the secondary battery according to the present invention is used for the above-described method for manufacturing the safety vent of the cap plate.

Accordingly, the device for manufacturing a safety vent of a cap plate according to the present invention includes a safety vent forming portion 10 including a lower forming portion 5 formed therein with a peripheral discharge part 52, accommodated therein with a lower elevating mold D2, and formed with a long elongated hole 51 rearward and forward, and an upper forming portion 4 disposed over the lower forming portion 5 so as to be movable up and down and provided therein with an upper elevating mold D1 so as to be movable up and down.

In addition, the device for manufacturing the safety vent according to the present invention includes a discharge material portion cutting portion 20 accommodated therein with a cutting device 6 configured to cut the discharge material portion 3, and having a lower forming portion 5 formed with a discharge material portion insertion hole 53, and a lower surface flattening portion 30 including a lower forming portion 5 having a flat upper surface and an upper forming portion 4 formed at a lower portion thereof with a safety vent insertion part 41.

In addition, the safety vent forming portion 10, the discharge material portion cutting portion 20, and the lower surface flattening portion 30 may be sequentially provided at one press P according to a moving sequence of the material plate 1, or may be provided at a plurality of presses P one by one.

Figure 6A:
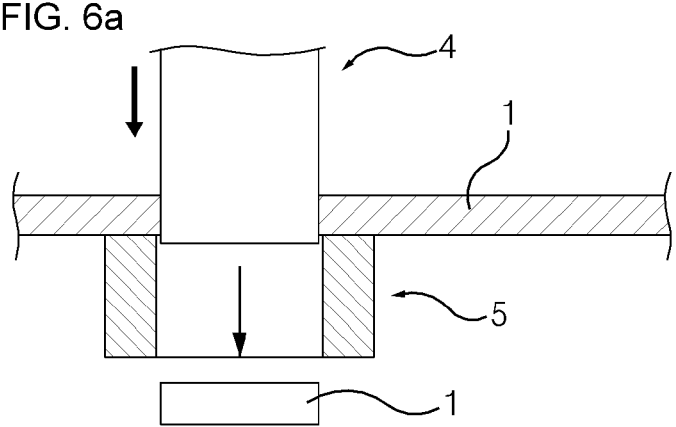
FIG. 6a is a front sectional view showing a material plate cutting step.
Figure 6B:
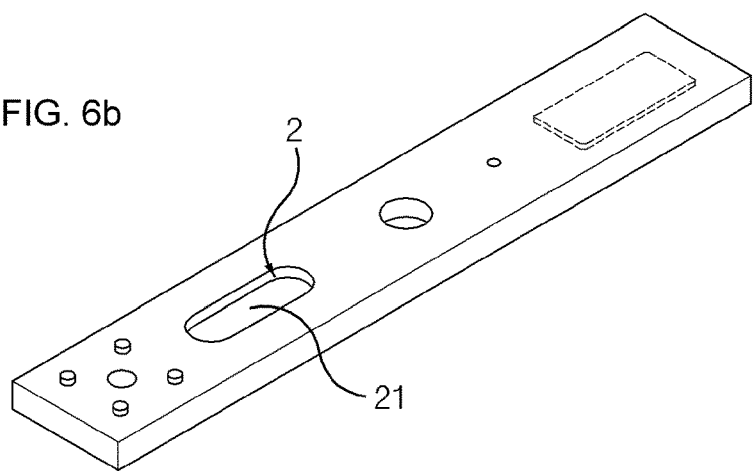
FIG. 6b is a perspective view showing a cap plate that is finally manufactured.
Figure 7A:
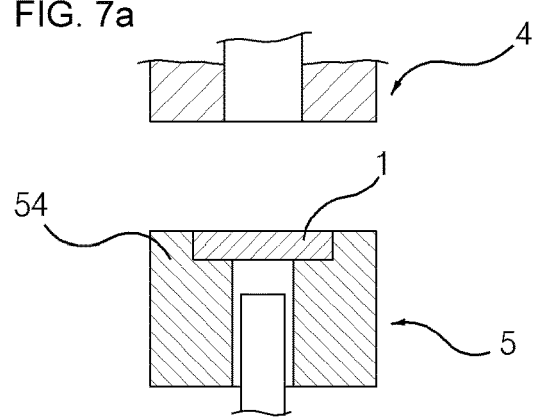
FIGS. 7a and 7b are front and side sectional views showing a state before forming the safety vent.
Figure 7B:
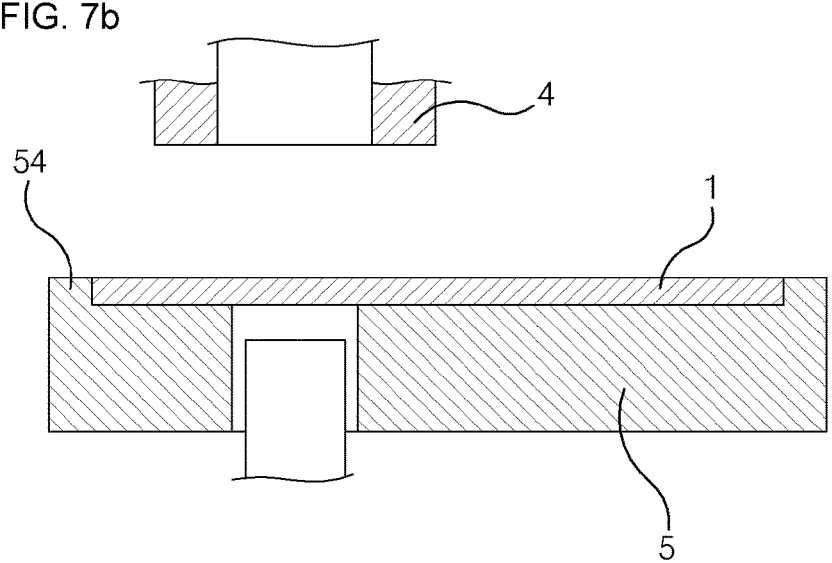
Figure 7C:
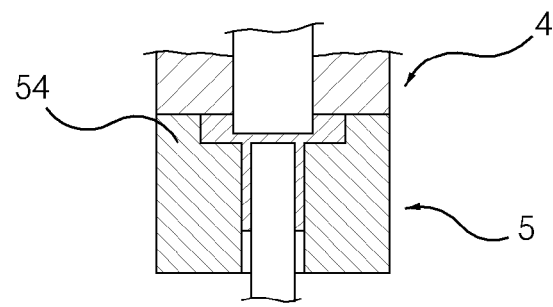
FIGS. 7c and 7d are front and side sectional views showing a state of forming a safety vent by operating upper and lower elevating molds.
Figure 7D:
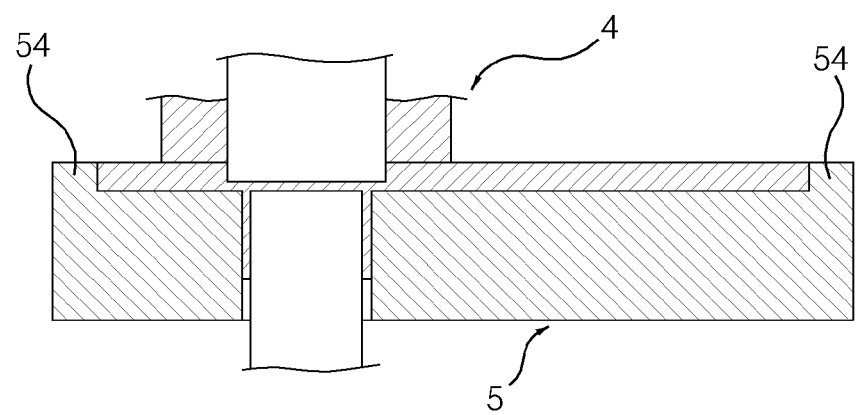
Figure 7E:
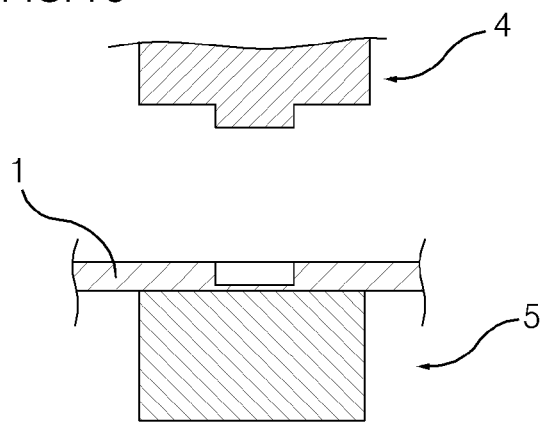
FIGS. 7e and 7f are front and side sectional views showing a state of performing a lower surface flattening forming step.
Figure 7F:
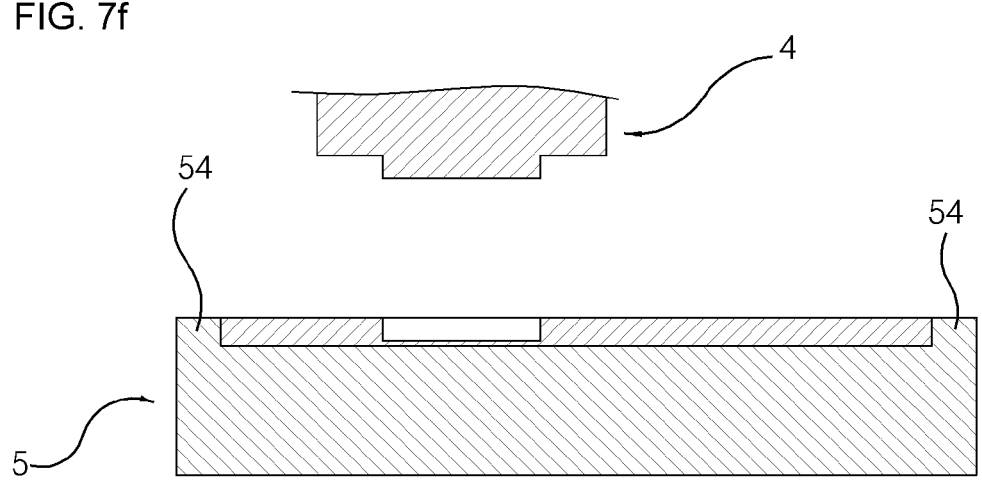
Figure 7G:
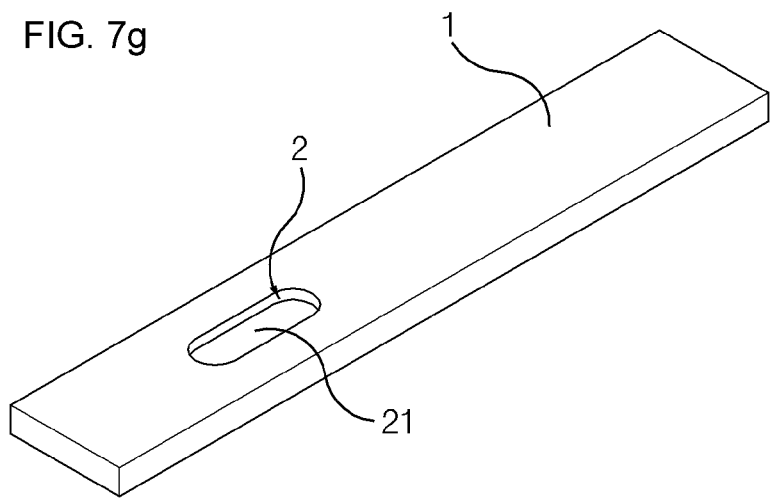
FIG. 7g is a perspective view showing a plate material in which the safety vent is formed.

FIG. 6 shows views illustrating a method for manufacturing a cap plate of a first embodiment according to the present invention.

The method for manufacturing a safety vent of a cap plate for a secondary battery of the first embodiment according to the present invention uses the above-described method for manufacturing the safety vent of the cap plate as shown in FIGS. 1 to 6, and is presumed to include all of the above-described method for manufacturing the safety vent of the cap plate.

Accordingly, in the method for manufacturing the cap plate of the first embodiment according to the present invention, the material plate 1 supplied during the safety vent forming step 100 is formed of a long plates extending laterally, and the safety vent forming step 100, the discharge material portion cutting and removing step 200, and the lower surface flattening forming step 300 are successively performed by continuously moving the long material plate 1 one-by-one pitch.

In other words, when the long material plate 1 is moved by every one pitch, the sequence proceeds such that the long material plate 1 descends, ascends, and move by every one pitch. In the case that the long material plate 1 is moved by one pitch as in the above manner, a plurality of moving pin holes into which elevating and moving pins are inserted are formed in front and rear of the material plate 1, and then the long material plate 1 is moved by every one pitch. Since the above configuration of moving the long material plate 1 by every one pitch is already applied and generally used in a forging press P, the descriptions for detailed configurations and operations will be omitted. Accordingly, before the material plate 1 is supplied, a plurality of moving pin holes (not shown) are perforated at the front and rear of the long material plate 1 moved by every one pitch.

In addition, according to the method for manufacturing the cap plate of the first embodiment according to the present invention, a post-forging forming step further proceeds in which, after the lower surface flattening forming step proceeds, at least one time of forging process of forging another configuration formed in the cap plate is performed by operating the press P. After the post-forging forming step is performed, a material plate cutting step proceeds in which the material plate 1 formed therein with the configuration different from a configuration of the safety vent 2 is cut into a rectangular shape as the cap plate by operating the press P, so that the cap plate is manufactured.

In other words, in the post-forging forming step, a rivet mount portion consisting essentially of a fluid inlet hole and a rivet hole is required to be forged and formed. In addition, a terminal plate or component fixing holes may be further molded through forging according to a type of the cap plate.

Accordingly, the method for manufacturing the cap plate of the first embodiment according to the present invention is the useful invention, since the cap plate is simply manufactured by cutting the long material plate 1 after simply forming the safety vent 2 through only once or two times of forging processes as described above so that the productivity of manufacturing the cap plate can be improved.

Therefore, the cap plate according to the present invention can be manufactured by a simple process through the above-described method for manufacturing the cap plate according to the first embodiment.

FIG. 7 shows views illustrating a method for manufacturing a cap plate of a second embodiment according to the present invention.

The method for manufacturing a safety vent of a cap plate for a secondary battery of the second embodiment according to the present invention uses the above-described method for manufacturing the safety vent of the cap plate as shown in FIGS. 1, 3 to 5, and 7, and is presumed to include all of the above-described method for manufacturing the safety vent of the cap plate.

Thus, according to the method for manufacturing the cap plate of the second embodiment according to the present invention, the material plate 1 supplied in the safety vent forming step 100 is formed of a rectangular material plate 1 having a rectangular periphery and elongated in the front and rear directions. In the safety vent forming step 100, when the rectangular material plate 1 is forged, a tight protruding part 54 is further formed on a periphery of the upper portion of the lower forming portion 5 so that the periphery of the rectangular material plate 1 comes into close contact. In the lower surface flattening forming step 300, when the rectangular material plate 1 is forged, a tight protruding part 54 is further formed on a periphery of the upper portion of the lower forming portion 5 so that the periphery of the rectangular material plate 1 comes into close contact.

In addition, according to the method for manufacturing the cap plate of the second embodiment according to the present invention, after the lower surface flattening forming step 300 proceeds, a post-forging forming step further proceeds in which a configuration different from a configuration of the safety vent 2 is formed by operating the press P by putting the formed rectangular material plate 1 into the next forging process. Thus, the cap plate is manufactured.

In other words, in the post-forging forming step, a rivet mount portion consisting essentially of a fluid inlet hole and a rivet hole is required to be forged and formed. In addition, a terminal plate or component fixing holes may be further molded through forging according to a type of the cap plate.

Accordingly, the method for manufacturing the cap plate of the second embodiment according to the present invention is the useful invention, since the cap plate is simply manufactured through the post-forging forming step after simply forming the safety vent 2 using only once or two times of forging processes as described above, so that the productivity of manufacturing a cap plate can be improved.

Therefore, the cap plate according to the present invention can be manufactured by a simple process through the above-described method for manufacturing the cap plate according to the second embodiment.

Although the preferred embodiment of the present invention has been described above, the present invention may use various changes, modifications, and equivalents. It is obvious that the present invention may be applied in the same manner by appropriately modifying the above embodiments. Therefore, the above description does not limit the scope of the invention as defined by the limitations of the following claims.

Although the detailed description of the present invention has been described exemplary embodiments, it shall be apparent to a person having ordinary skill in the art that various modifications are available without departing from the scope of the invention.

[Description of Reference Numerals]

| | |
|---|---|
| 1: Material plate | 2: Safety vent |
| 21: Vent plate | 3: Discharge material portion |
| 31: Residual material part | 4: Upper forming portion |
| 41: Safety vent insertion part | 5: Lower forming portion |
| 51: Elongated hole | 52: Peripheral discharge part |
| 53: Discharge material portion insertion hole | |
| 54: Tight protruding part | 6: Cutting device |
| 61: Internal cutting member | |
| 62a, 62b, 62c, 62d: Front, rear, left and right cutting members | |
| C: Slant blade portion | D1: Upper elevating mold |
| D2: Lower elevating mold | P: Press |

The invention claimed is:

1. A method for manufacturing a safety vent of a cap plate for a secondary battery, the method comprising:
   a safety vent forming step (100) in which a material plate of a cap plate is put on a top surface of a lower forming portion of a press, which includes a lower forming portion formed with a long elongated hole extending back and forth and provided therein with a lower elevating mold that defines a peripheral discharge part, and an upper forming portion provided therein with an upper elevating mold, a material is discharged to the peripheral discharge part to form a discharge material portion while forming a safety vent having a groove shape and formed at a lower portion thereof with a vent plate through downward movement of the upper forming portion and the upper elevating mold and upward movement of the lower elevating mold, and the safety vent is formed through upward movement of the upper forming portion and the upper elevating mold and downward movement of the lower elevating mold;
   a discharge material portion cutting and removing step (200) in which the discharge material portion of the material plate is inserted into a discharge material portion insertion hole by putting the safety vent material plate formed with the safety vent onto the top surface of the lower forming portion of the press having the lower forming portion formed with the discharge material portion insertion hole accommodating a cutting device for cutting an upper portion of the discharge material portion, and the upper portion of the discharge material portion is cut by operating the cutting device for the discharge material portion so as to remove the discharge material portion; and
   a lower surface flattening forming step (300) in which the material plate from which the upper portion of the discharge material portion is cut is put on the top surface of the lower forming portion of the press having the lower forming portion with a flat top surface and the upper forming portion formed at a lower portion thereof with a safety vent insertion part,
   a bottom surface of the material plate is flattened through downward movement of the upper forming portion, and the upper forming portion is moved up.

2. The method of claim 1, wherein, the safety vent forming step (100) includes moving down the upper forming portion and the upper elevating mold and simultaneously moving up the lower elevating mold, or moving up the lower elevating mold after moving down the upper forming portion and the upper elevating mold.

3. The method of claim 1, wherein the cutting device includes an internal cutting member positioned inside the discharge material portion, formed with slant blade portions at front, rear, left and right edges of an upper periphery of the cutting device, and configured to be movable in front, rear, left, and right directions through a driving device,
   wherein, in the discharge material portion cutting and removing step (200), the internal cutting member sequentially moves in the left direction and returns, moves in the right direction and returns, moves in the front direction and returns, and moves in the rear direction and returns so as to cut the upper portion of the discharge material portion.

4. The method of claim 1, wherein the cutting device includes front, rear, left, and right cutting members positioned at front, rear, left and right sides out of the discharge material portion, formed at each upper inner edge thereof with a slant blade portion, and sequentially moved inward and outward one by one by the driving device to cut the upper portion of the discharge material portion.

5. A device for manufacturing a safety vent of a cap plate for a secondary battery, the device comprising:
   a safety vent forming portion including a lower forming portion formed therein with a peripheral discharge part, accommodated therein with a lower elevating mold, and formed with a long elongated hole rearward and forward, and an upper forming portion disposed over the lower forming portion so as to be movable up and down and provided therein with an upper elevating mold so as to be movable up and down;
   a discharge material portion cutting portion having a lower forming portion formed with a discharge material portion insertion hole accommodating a cutting device for cutting a discharge material portion; and
   a lower surface flattening portion including a lower forming portion having a flat upper surface and an upper forming portion formed at a lower portion thereof with a safety vent insertion part, wherein
   the safety vent forming portion, the discharge material portion cutting portion, and the lower surface flattening portion are sequentially provided at one press or provided at a plurality of presses one by one.

6. A method for manufacturing a cap plate for a secondary battery, the method comprising the method for manufacturing a safety vent of a cap plate of claim 1, wherein the material plate supplied in the safety vent forming step (100) is formed of a long plate extending laterally, the safety vent forming step (100), the discharge material portion cutting and removing step (200), and the lower surface flattening forming step (300) are successively performed by continuously moving the long material plate one-by-one pitch, a post-forging forming step further proceeds in which a forging process of forging another configuration formed in the cap plate is performed at least one time by operating the press after the lower surface flattening forming step 300 proceeds, and a material plate cutting step is further performed in which the material plate formed therein with the configuration different from a configuration of the safety vent is cut into a rectangular shape corresponding to a shape of the cap plate by operating the press after the post-forging forming step is performed.

7. A method for manufacturing a cap plate for a secondary battery, the method comprising the method for manufacturing the safety vent of the cap plate of claim 1, wherein the material plate supplied in the safety vent forming step is formed of a rectangular material plate having a rectangular periphery and elongated in front and rear directions, a tight protruding part is further formed on a periphery of the upper portion of the lower forming portion so that the periphery of the rectangular material plate comes into close contact with the tight protruding part when the rectangular material plate is forged in the safety vent forming step, a tight protruding part is further formed on a periphery of the upper portion of the lower forming portion so that the periphery of the rectangular material plate comes into close contact with the tight protruding part when the rectangular material plate is forged in the lower surface flattening forming step, and a post-forging forming step further proceeds in which a configuration different from a configuration of the safety vent is formed by operating the press by putting the formed rectangular material plate into a next forging process after the lower surface flattening forming step proceeds.

* * * * *